US011148604B2

(12) United States Patent
Wang et al.

(10) Patent No.: US 11,148,604 B2
(45) Date of Patent: Oct. 19, 2021

(54) RACK ASSEMBLY

(71) Applicant: KING RACK INDUSTRIAL CO., LTD., Taichung (TW)

(72) Inventors: Chiu-Kuei Wang, Taichung (TW); Hugues Espesset, St-Juery (FR); Frédéric Girod, St-Juery (FR)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/910,087

(22) Filed: Jun. 24, 2020

(65) Prior Publication Data
US 2020/0406825 A1 Dec. 31, 2020

(30) Foreign Application Priority Data

Jun. 27, 2019 (TW) ................. 108208242

(51) Int. Cl.
*B60R 9/04* (2006.01)
*B60R 9/048* (2006.01)
*B60R 9/045* (2006.01)
*B60R 9/06* (2006.01)
*B60R 9/10* (2006.01)

(52) U.S. Cl.
CPC ............. *B60R 9/048* (2013.01); *B60R 9/045* (2013.01); *B60R 9/06* (2013.01); *B60R 9/10* (2013.01)

(58) Field of Classification Search
CPC ........... B60R 9/048; B60R 9/045; B60R 9/10; B60R 9/06
See application file for complete search history.

(56) References Cited

U.S. PATENT DOCUMENTS

| 3,272,464 | A | * | 9/1966 | Jacobson | A47F 5/04 248/125.8 |
| 3,901,421 | A | * | 8/1975 | Kalicki | B60R 9/10 224/310 |
| 5,082,120 | A | * | 1/1992 | Vega | B62H 3/12 211/17 |
| 5,232,133 | A | * | 8/1993 | Speer | B60R 9/06 224/485 |
| 8,480,098 | B2 | * | 7/2013 | Liao | B62B 3/02 280/47.26 |
| 10,131,371 | B2 | * | 11/2018 | Camarco | B60R 9/06 |
| 10,183,627 | B1 | | 1/2019 | Liu | |

(Continued)

FOREIGN PATENT DOCUMENTS

DE 202013103898 U1 9/2013
EP 3351432 A1 7/2018
(Continued)

*Primary Examiner* — Ko H Chan
(74) *Attorney, Agent, or Firm* — ScienBiziP, P.C.

(57) ABSTRACT

A rack assembly configured to carry a load includes a frame unit, a support unit, and a securing unit. The support unit is coupled to the frame unit and is configured to support the load thereon. The securing unit is coupled to the frame unit, is configured to secure the load thereto, and includes a first base, a second base, a first leg, and a second leg. The second base has a length greater than a distance between first and second ends of the first base. The first leg interconnects the first end of the first base and the second base. The second leg interconnects the second end of the first base and the second base.

20 Claims, 15 Drawing Sheets

(56) References Cited

U.S. PATENT DOCUMENTS

2016/0001710 A1* 1/2016 Prescott .................... B60R 9/06
224/536
2016/0375838 A1* 12/2016 Gray ........................ B60R 9/10
224/522

FOREIGN PATENT DOCUMENTS

| WO | 2006110078 A1 | 10/2006 |
| WO | 2013160034 A1 | 10/2013 |

* cited by examiner

RACK ASSEMBLY

CROSS REFERENCE TO RELATED APPLICATION

This application claims priority to Taiwanese application no. 108208242, filed Jun. 27, 2019.

BACKGROUND

A conventional bicycle rack is mounted on a rear of a car, carries a bicycle, and includes a frame unit and a support unit. The support unit includes first and second support links and first and second support members. The first support link has a first end connected to the frame unit and a second end opposite the first end thereof. The first support member is mounted on the second end of the first support link and supports a front wheel of the bicycle thereon. The second support link has a first end connected to the frame unit and a second end opposite the first end thereof. The second support member is mounted on the second end of the second support link and supports a rear wheel of the bicycle thereon.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Detailed descriptions of the present disclosure are illustrated below in conjunction with the accompanying drawings. However, it is to be understood that the descriptions and the accompanying drawings disclosed herein are merely illustrative and exemplary and not intended to limit the scope of the present disclosure.

Exemplary embodiments as described herein include a rack assembly, e.g., rack assembly 100 (shown in FIG. 1), configured to be mounted on, e.g., a vehicle, such as on a rear/roof of a car, and to carry a load, e.g., a bicycle. The rack assembly 100 includes a securing member, e.g., securing member 180, and a fastening member, e.g., fastening member 190, configured to fasten the load to the securing member 180. In certain embodiments, the securing member 180 has a shape/size that corresponds to the shape/size of a frame of the load. As such, as will be described hereinbelow, when the fastening member 190 fastens the frame of the load to the securing member 180, the fastening member 190 forms a substantially right angle, instead of an inclined angle, with the securing member 180 and the frame of the load. Such an orientation of the fastening member 190 ensures stabler and safer carrying of the load by the rack assembly 100 of the present disclosure.

Figure 1:
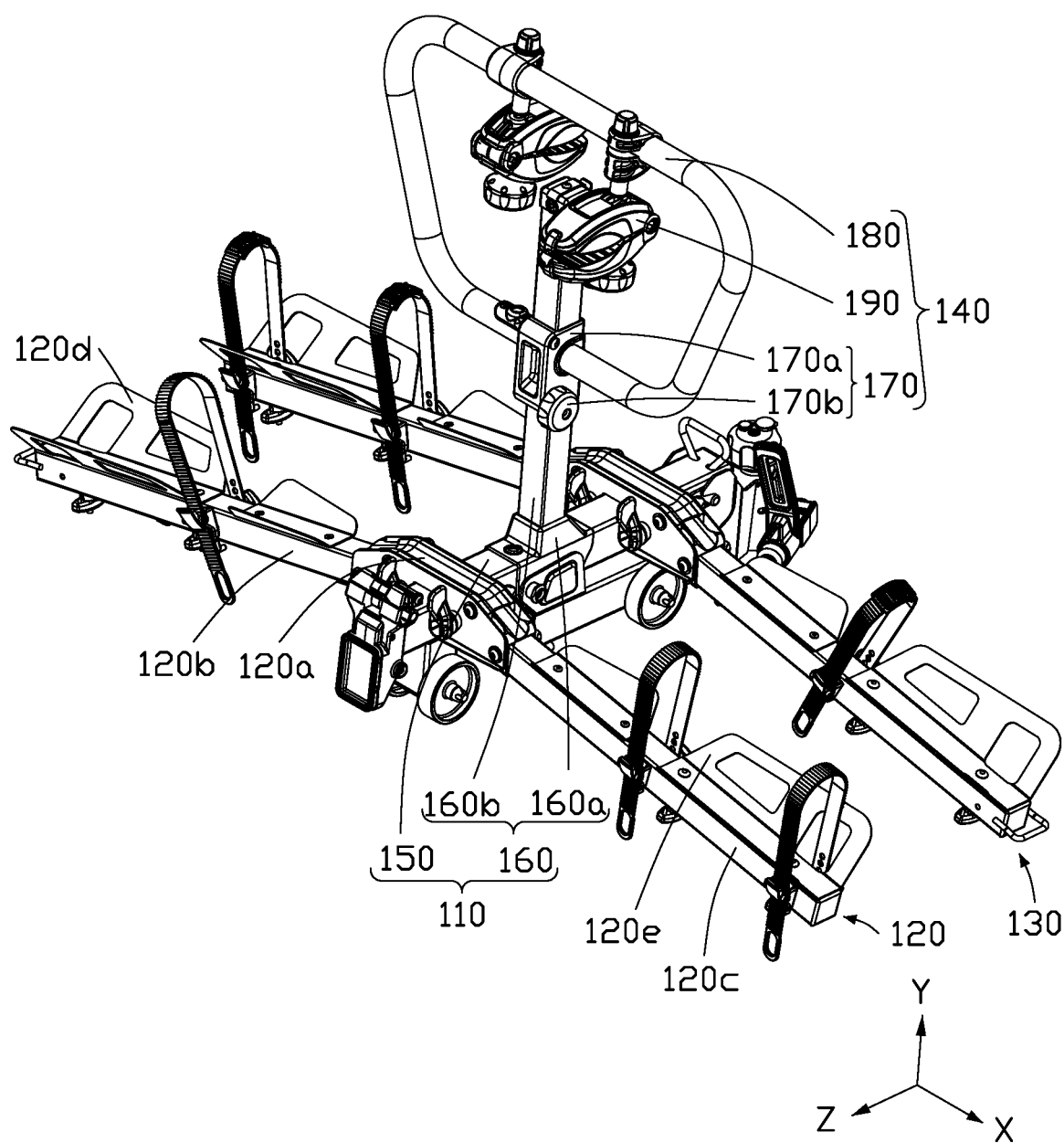
FIG. 1 is a schematic perspective view illustrating the first exemplary rack assembly according to some embodiments of the present disclosure.
Figure 8:
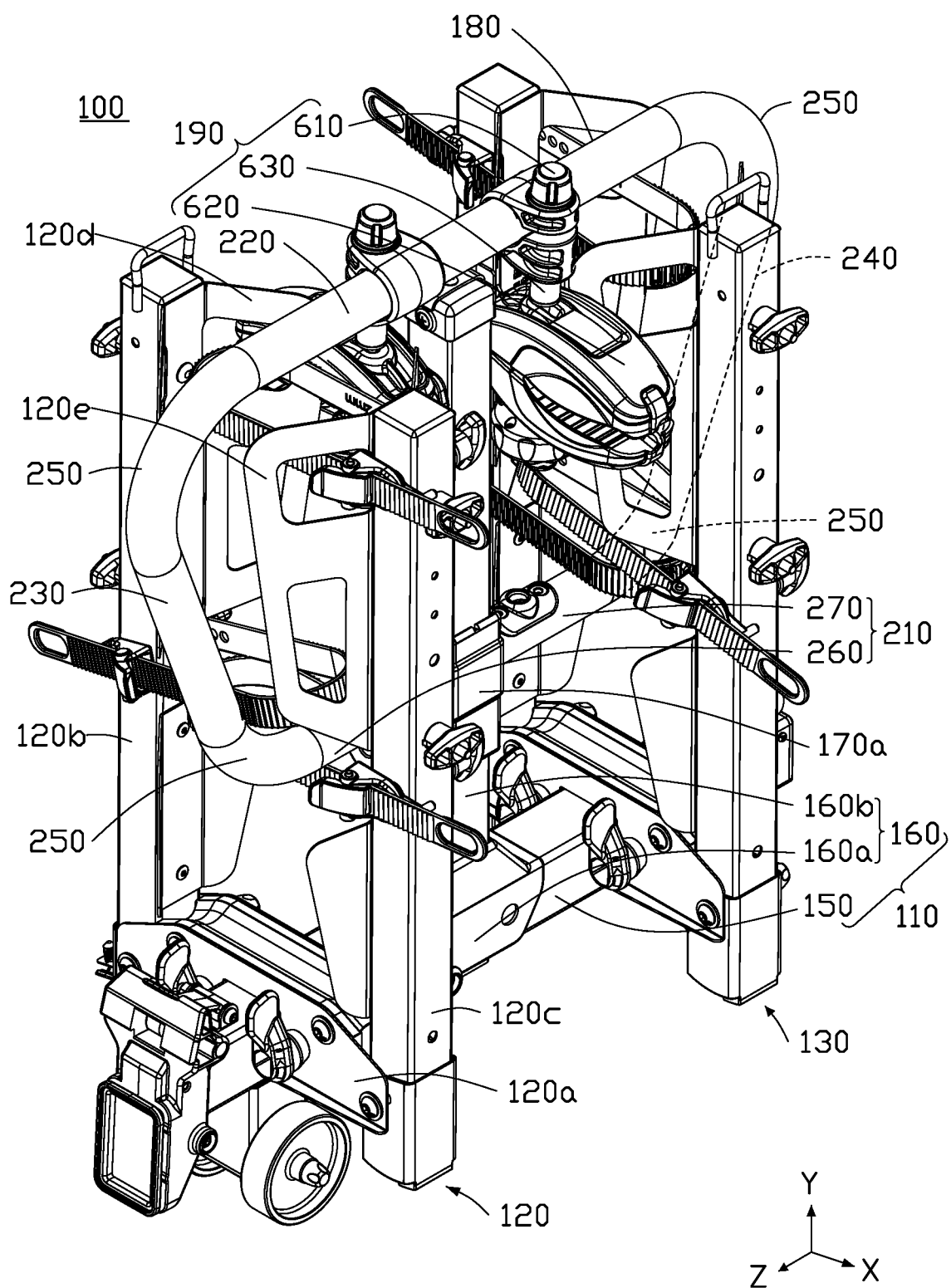
FIG. 8 is a schematic perspective view illustrating a state where the first exemplary rack assembly is in a folded position according to some embodiments of the present disclosure.

FIG. 1 is a schematic perspective view of the first exemplary rack assembly 100 according to some embodiments of the present disclosure. FIG. 1 illustrates a state where the rack assembly 100 is in a carrying position. As will be described later below, the rack assembly 100 is configured to be put from the carrying position to a folded position, as illustrated in FIG. 8. The rack assembly 100 is configured to be mounted on, e.g., a vehicle, such as on a rear/roof of a car, and to carry a load, e.g., a bicycle. As shown in FIG. 1, the rack assembly 100 includes a frame unit 110, first and second support units 120, 130, and a securing unit 140. The frame unit 110 has a generally inverted "T" shape and includes a first frame member 150 and a second frame member 160. The first frame member 150 extends in a first direction, e.g., along the Z axis. The second frame member 160 extends in a second direction, e.g., along the Y axis, substantially perpendicular to the first direction, and is mounted on a middle portion of the first frame member 150 between first and second ends of the first frame member 150.

The second frame member 160 includes a coupling portion 160*a* and a post portion 160*b*. The coupling portion 160*a* is connected detachably to the middle portion of the first frame member 150, e.g., using a screw, a nut-and-bolt, a pin, a clamp, or the like. That is, the coupling portion 160*a* and the first frame member 150 may be detached or disconnected from each other without damaging the coupling portion 160a and/or first frame member 150.

In some embodiments, the coupling portion 160a is connected fixedly to the middle portion of the first frame member 150, such as by welding, riveting, or the like. In such some embodiments, the coupling portion 160a and/or the first frame member 150 may be damaged when the coupling portion 160a and the first frame member 150 are detached or disconnected from each other. In other embodiments, the coupling portion 160a is integral with the first frame member 150. In other words, the first frame member 150 and the coupling portion 160a are formed into a single piece.

In this exemplary embodiment, the coupling portion 160a is tubular, surrounds the Y axis, and has a polygonal cross-section, e.g., square, in the top view. In an alternative embodiment, the coupling portion 160a has a circular cross-section in the top view.

The post portion 160b extends along the Y axis and has a bottom inserted in the coupling portion 160a. In this exemplary embodiment, the post portion 160b is connected detachably to the coupling portion 160a, e.g., using a screw, a nut-and-bolt, a pin, a clamp, or the like. That is, the post portion 160b and the coupling portion 160a may be detached or disconnected from each other without damaging the post portion 160b and/or the coupling portion 160a. In this exemplary embodiment, the post portion 160b has a polygonal cross-section, e.g., square, in the top view. In an alternative embodiment, the post portion 160b has a circular cross-section in the top view. In certain embodiments, the post portion 160b is tubular and is sleeved on the coupling portion 160a.

In some embodiments, the post portion 160b is connected fixedly to the coupling portion 160a, such as by welding, riveting, or the like. That is, the post portion 160b and/or the coupling portion 160a may be damaged when the post portion 160b and the coupling portion 160a are detached or disconnected from each other. In other embodiments, the post portion 160b is integral with the coupling portion 160a. In other words, the post portion 160b and the coupling portion 160a are formed into a single piece.

The first support unit 120 is mounted on the first frame member 150 between the first end and the middle portion of the first frame member 150 and is configured to support the load thereon. As shown in FIG. 1, the first support unit 120 includes a pivot member 120a, first and second support links 120b, 120c, and first and second support members 120d, 120e. The pivot member 120a extends in a third direction substantially perpendicular to the first and second directions, e.g., substantially parallel to the X axis. For example, the pivot member 120a is connected detachably or fixedly to the first frame member 150 between the first end and the middle portion of the first frame member 150. The pivot member 120a may be integral with the first frame member 150.

The first support link 120b has a first end connected pivotably to the pivot member 120a and a second end opposite the first end thereof. The first support member 120d is mounted on the second end of the first support link 120b and is configured to support a portion of the load thereon, e.g., front/rear wheel of a bicycle.

The second support link 120c has a first end connected pivotably to the pivot member 120a and a second end opposite the first end thereof. The second support member 120e is mounted on the second end of the second support link 120c and is configured to support another portion of the load thereon, e.g., rear/front wheel of a bicycle.

As shown in FIG. 1, when the rack assembly 100 is in the carrying position, the first and second support links 120b, 120c form a carrying angle therebetween. In some embodiments, the carrying angle is from about 110 degrees to about 250 degrees, e.g., about 200 degrees. In other embodiments, the carrying angle is from about 140 to about 220, e.g., about to 190 degrees.

The second support unit 130 is mounted on the first frame member 150 between the second end and the middle portion of the first frame member 150 and is configured to support another load thereon, e.g., another bicycle. Since the structure of the second support unit 130 is similar to that described above with respect to the first support unit 120, a detailed description thereof is dispensed herein for the sake of brevity.

Although the rack assembly 100 is exemplified with a pair of support units, e.g., support units 120, 130, it should be apparent that, after reading this disclosure, the number of support units may be decreased or increased as required.

The securing unit 140 includes a sliding member 170, a securing member 180, and a fastening member 190. The sliding member 170 is coupled movably, e.g., slidably, to the post portion 160b and includes a moving portion 170a and a fixing portion 170b. The moving portion 170a is tubular, surrounds the Y axis, is sleeved on the post portion 160b, and is configured to move, i.e., slide, along the length of the post portion 160b. In this exemplary embodiment, the moving portion 170a has a polygonal cross-section, e.g., square, in the top view. In an alternative embodiment, the moving portion 170a has a circular cross-section in the top view. In certain embodiments, the moving portion 170a is telescopically coupled to the post portion 160b. In such certain embodiments, the post portion 160b is tubular and the moving portion 170a is elongated and is inserted in the post portion 160b.

The fixing portion 170b is configured to fix the moving portion 170a at a position along the length of the post portion 160b. In this exemplary embodiment, the fixing portion 170b is in the form of a screw configured to be coupled threadedly to the moving portion 170a and to abut against the post portion 160b. In some embodiments, the fixing portion 170b is in the form of a nut-and-bolt, a pin, a clamp, or the like. In other embodiments, the fixing portion 170b is configured to be coupled threadedly to the post portion 160b and to abut against the moving portion 170a.

The sliding member 170 is further coupled removably to the post portion 160b. That is, the sliding member 170 and the post portion 160b may be detached or disconnected from each other without damaging the sliding member 170 and/or the post portion 160b.

The securing member 180 is coupled to the moving portion 170a so as to be co-movable therewith. In further detail, FIG. 2 is a schematic front view illustrating the securing member 180 of the securing unit 140 of the first exemplary rack assembly 100 according to some embodiments of the present disclosure.

Figure 2:
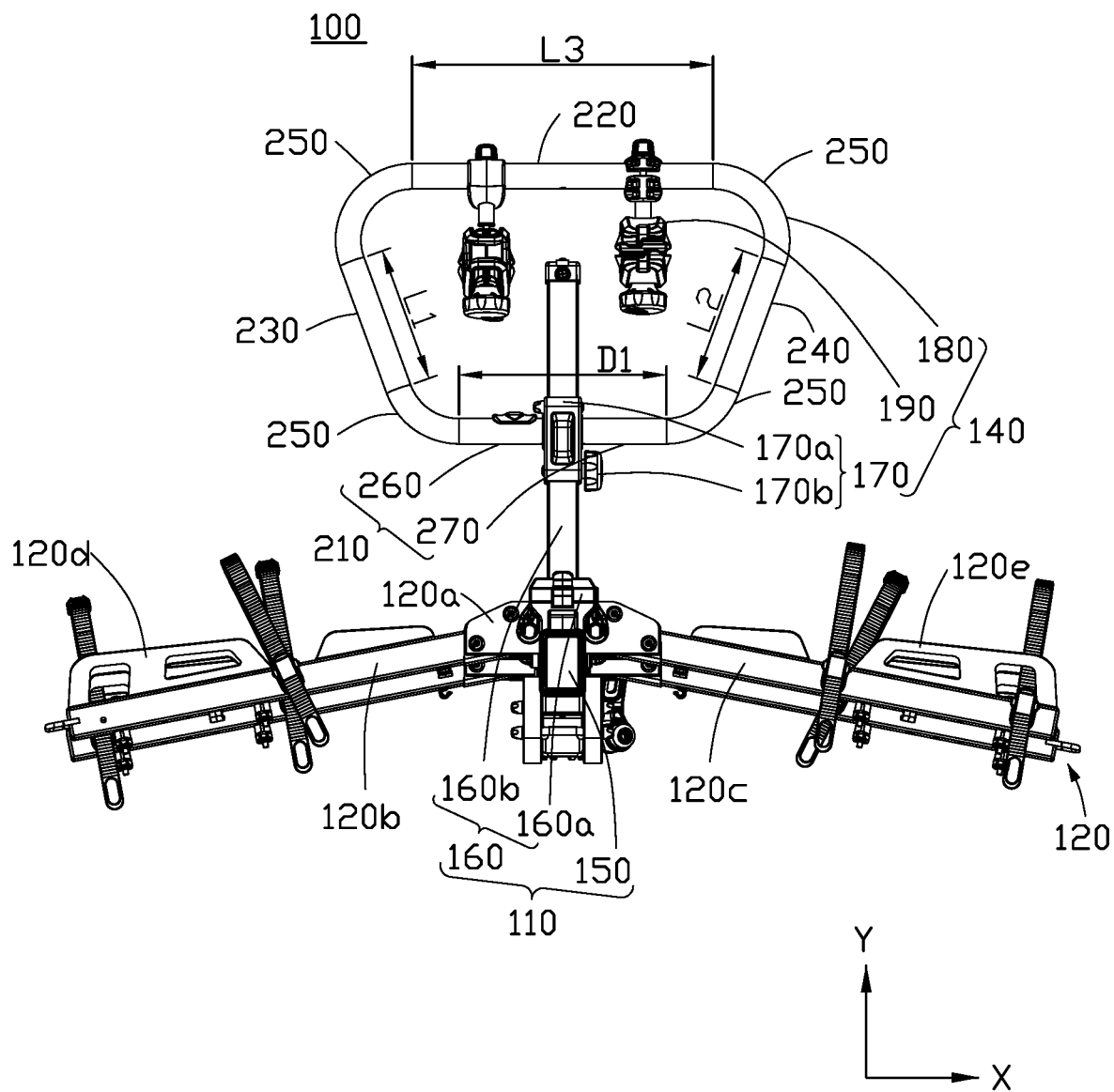
FIG. 2 is a schematic front view illustrating a securing unit of the first exemplary rack assembly according to some embodiments of the present disclosure.

As shown in FIG. 2, the securing member 180 is generally trapezoidal in shape and includes a first base 210, a second base 220, a first leg 230, a second leg 240, and rounded corners 250. In this exemplary embodiment, the first base 210 is substantially perpendicular to the post portion 160b, e.g., the Y axis, and includes first and second base portions 260, 270. Each of the first and second base portions 260, 270 has a first end connected fixedly to a respective one of opposite sides of the moving portion 170a, such as by welding, riveting, or the like, and a second end opposite the first end thereof. That is, the first base 210 and/or the moving portion 170a may be damaged when the first base 210 and the moving portion 170a are detached or disconnected from each other.

In some embodiments, the first end of each of the first and second base portions 260, 270 is connected detachably to the respective one of the opposite sides of the moving portion 170a, such as by a screw, a nut-and-bolt, a pin, a clamp, or the like. That is, the first base 210 and the moving portion 170a may be detached or disconnected from each other without damaging the first base 210 and/or the moving portion 170a. In other embodiments, the first base 210 is integral with the moving portion 170a. In other words, the first base 210 and the moving portion 170a are formed into a single piece. For example, the first and second base portions 260, 270 have substantially the same length as each other. The first and second base portions 260, 270 may have different lengths from each other.

In certain embodiments, the first end of one of the first and second base portions 260, 270 is connected fixedly to the moving portion 170a and the first end of the other of the first and second base portions 260, 270 is connected detachably to or is integral with the moving portion 170a.

The first leg 230 interconnects the second end of the first base portion and the second base 220. In this exemplary embodiment, the first leg 230 is inclined to the post portion 160b, e.g., the Y axis, is generally straight, and has a length (L1) less than a distance (D1) between the second end of the first base portion 260 and the second end of the second base portion 270.

In this exemplary embodiment, the first leg 230 is integral with the first base portion 260. In other words, the first leg 230 and the first base portion 260 are formed into a single piece. In some embodiments, the first leg 230 is connected fixedly to the first base portion 260, such as by welding, riveting, or the like. That is, the first leg 230 and/or the first base portion 260 may be damaged when the first leg 230 and the first base portion 260 are detached or disconnected from each other. In other embodiments, the first leg 230 is connected detachably to the first base portion 260, such as by a screw, a nut-and-bolt, a pin, a clamp, or the like. That is, the first leg 230 and the first base portion 260 may be detached or disconnected from each other without damaging the first leg 230 and/or the first base portion 260.

The second leg 240 interconnects the second end of the second base portion 270 and the second base 220. In this exemplary embodiment, the second leg 240 is inclined to the post portion 160b, e.g., the Y axis, is generally straight, and has a length (L2) substantially equal to the length (L1) of the first leg 230. As shown in FIG. 2, the second leg 240 and the second base portion 270 form an angle therebetween substantially equal to an angle between the first leg 230 and the first base portion 260.

In this exemplary embodiment, the second leg 240 is integral with the second base portion 270. In other words, the second leg 240 and the second base portion 270 are formed into a single piece. In some embodiments, the second leg 240 is connected fixedly to the second base portion 270, such as by welding, riveting, or the like. That is, the second leg 240 and/or the second base portion 270 may be damaged when the second base portion 270 and the second leg 240 are detached or disconnected from each other. In other embodiments, the second leg 240 is connected detachably to the second base portion 270, such as by a screw, a nut-and-bolt, a pin, a clamp, or the like. That is, the second leg 240 and the second base portion 270 may be detached or disconnected from each other without damaging the second leg 240 and/or the second base portion 270.

Although the first and second legs 230, 240 of this embodiment are exemplified as inclined to the post portion 160b, e.g., the Y axis, in an alternative embodiment, one of the first and second legs 230, 240 is inclined to the post portion 160b, e.g., the Y axis, and the other of the first and second legs 230, 240 is substantially parallel to the post portion 160b, e.g., the Y axis.

The second base 220 is above the first base 210. In this exemplary embodiment, the second base 220 extends substantially perpendicular to the post portion 160b, e.g., the Y axis, is generally straight, and has a length (L3) greater than the distance (D1) between the second end of the first base portion 260 and the second end of the second base portion 270. As shown in FIG. 2, the second base 220 and the first leg 230 form an angle therebetween substantially equal to an angle between the second base 220 and the second leg 240. In this exemplary embodiment, the second base 220 is integral with the first and second legs 230, 240. In other words, the second base 220 and the first and second legs 230, 240 are formed into one piece.

In some embodiments, the second base 220 is connected fixedly to the first and second legs 230, 240, such as by welding, riveting, or the like. That is, the second base 220, the first leg 230, and/or the second leg 240 may be damaged when the second base 220 and the first leg 230 (or the second leg 240) are detached or disconnected from each other. In other embodiments, the second base 220 is connected detachably to the first and second legs 230, 240, such as by a screw, a nut-and-bolt, a pin, a clamp, or the like. That is, the second base 230 may be detached or disconnected from the first leg 230 (or the second leg 240) without damaging the second base 220, the first leg 230, and/or the second leg 240. In certain embodiments, the second base 220 is integral with one of the first and second legs 230, 240 and is connected fixedly or detachably to the other of the first and second legs 230, 240.

As shown in FIGS. 1 and 2, when the rack assembly 100 is in the carrying position, the securing member 180 is oriented substantially perpendicular to the first frame member 150, e.g., lies on an XY plane.

Figure 3:
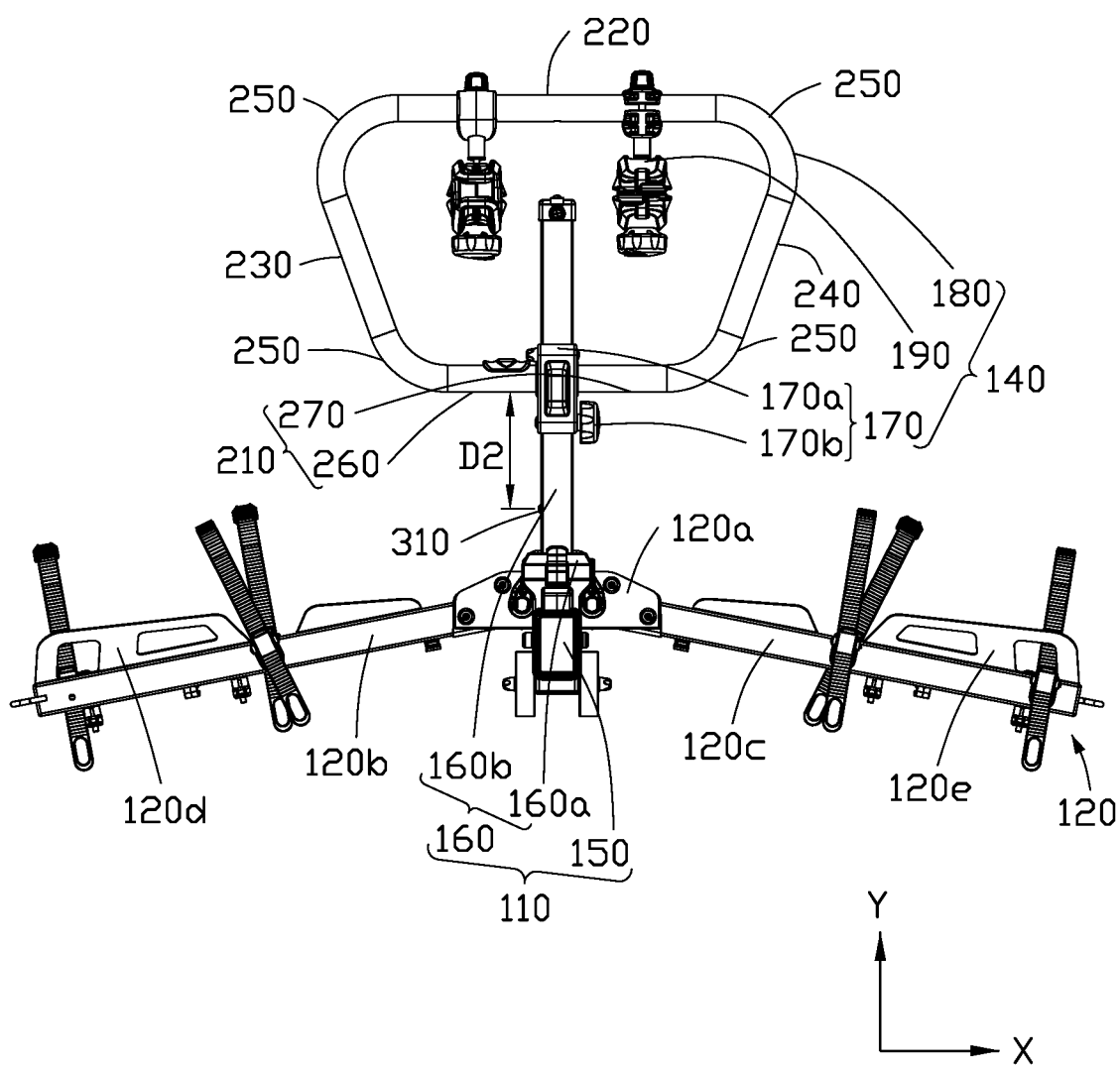
FIG. 3 is a schematic front view illustrating a state where the securing unit of the first exemplary rack assembly is in an extended position according to some embodiments of the present disclosure.
Figure 4:
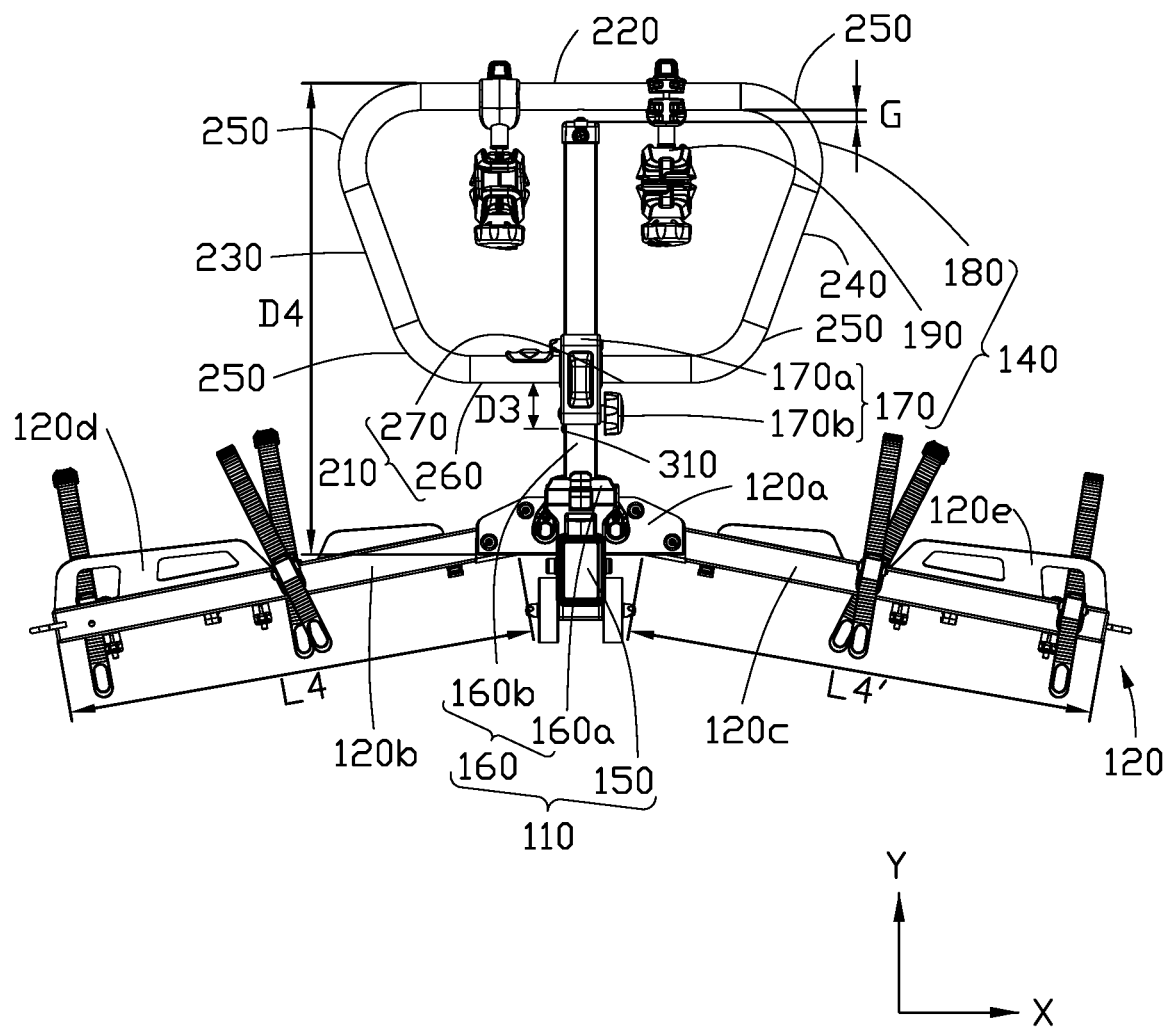
FIG. 4 is a schematic front view illustrating a state where the securing unit of the first exemplary rack assembly is in a retracted position according to some embodiments of the present disclosure.

FIG. 3 is a schematic front view illustrating a state where the securing member 180 of the securing unit 140 of the first exemplary rack assembly 100 is in an extended position according to some embodiments of the present disclosure. FIG. 4 is a schematic front view illustrating a state where the securing member 180 of the securing unit 140 of the first exemplary rack assembly 100 is in a retracted position according to some embodiments of the present disclosure. As shown in FIG. 3, the rack assembly 100 further includes a restricting member 310 that protrudes from the post portion 160b at a position above the coupling portion 160a. In this exemplary embodiment, the securing member 180 is co-movable with the sliding member 170 between an extended position, where the first base 210 is at a first distance (D2) from the restricting member 310, as shown in FIG. 3, and a retracted position, where the first base 210 is at a second distance (D3) from the restricting member 310 less than the first distance (D2), as shown in FIG. 4.

As shown in FIG. 4, when the securing member 180 is at the retracted position, the sliding member 170 abuts the restricting member 310 and a gap (G) is formed between the second base 220 and a top of the post portion 160b. The construction as such prevents fingers of the user from getting crushed between the second base 220 and the top of the post 160b when the user moves the securing member 180 from the extended position to the retracted position.

In some embodiments, the rack assembly 100 is dispensed with the restricting member 310. In such some embodiments, when the securing member 180 is at the retracted position, the sliding member 170 abuts the coupling portion 160a and the second base 220 and the top of the post portion 160b form the gap (G) therebetween. In other embodiments, the rack assembly 100 is dispensed with the restricting member 310. In such other embodiments, when the securing member 180 is at the retracted position, the sliding member 170 abuts the first frame member 150 and the second base 220 and the top of the post portion 160b form the gap (G) therebetween.

As shown in FIG. 4, in some embodiments, when the securing member 180 is at the retracted position, a distance (D4) between the second base 220 and the first frame member 150 (or the pivot member 120a) is substantially equal to a length (L4) of the first support link 120b and/or a length (L4') of the second support link 120c. In other embodiments, when the securing member 180 is at the retracted position, the distance (D4) between the second base 220 and the first frame member 150 (or the pivot member 120a) is less than the length (L4) of the first support link 120b and/or the length (L4') of the second support link 120c.

Figure 5:
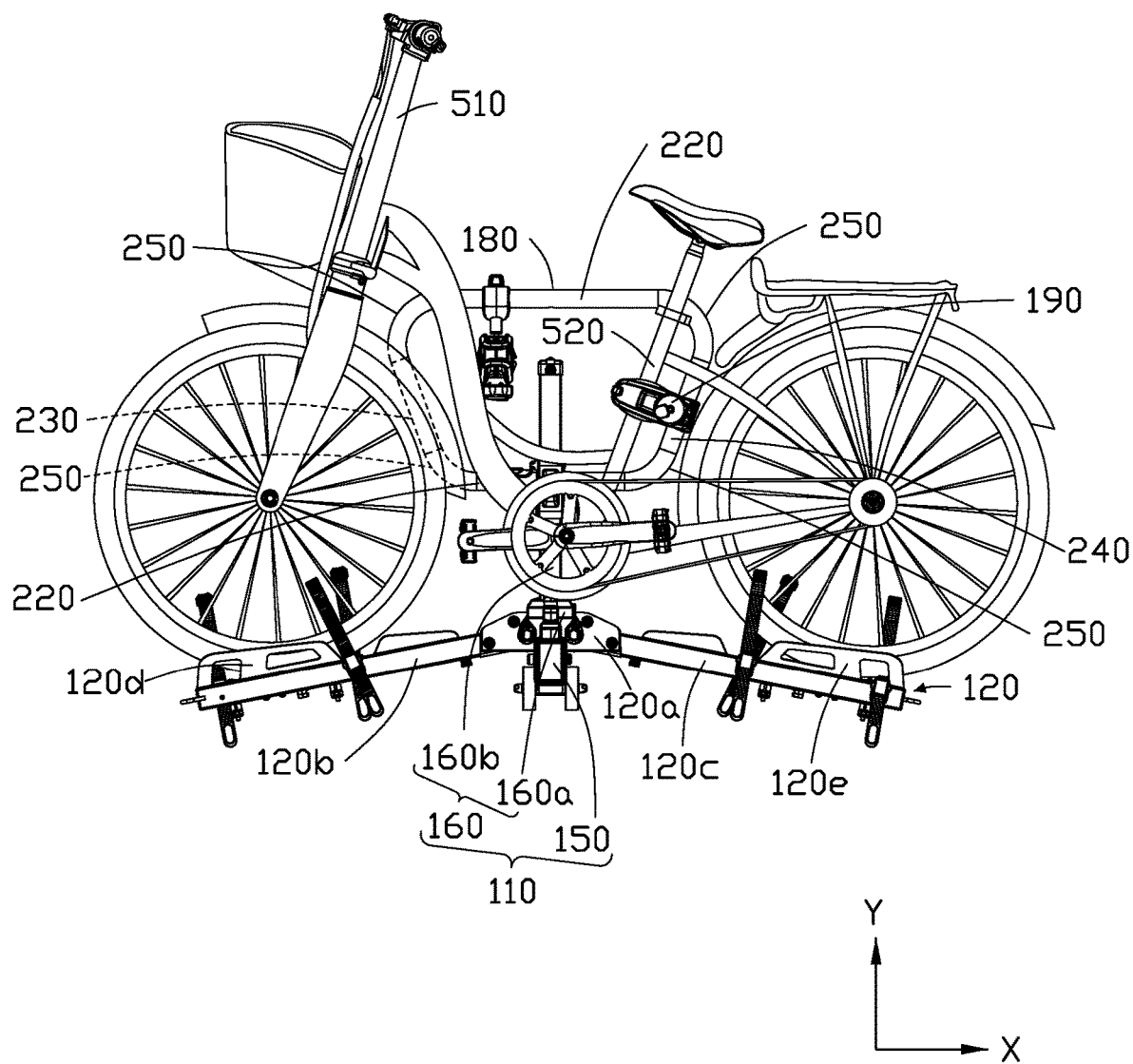
FIG. 5 is a schematic perspective view illustrating a state where the first exemplary rack assembly carries a bicycle according to some embodiments of the present disclosure.
Figure 6:
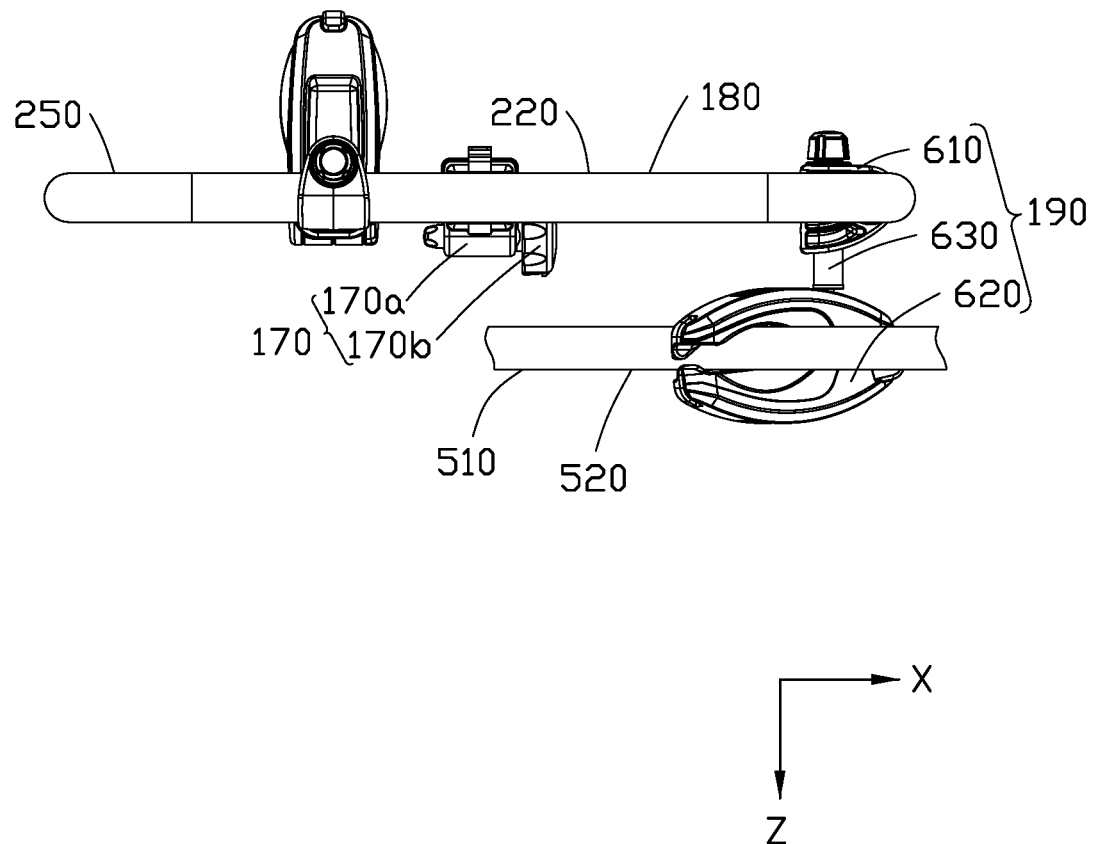
FIG. 6 is a fragmentary schematic top view illustrating a state where the securing unit of the first exemplary rack assembly secures the bicycle thereto according to some embodiments of the present disclosure.

FIG. 5 is a schematic perspective view illustrating a state where the first exemplary rack assembly 100 carries a bicycle 510 according to some embodiments of the present disclosure. FIG. 6 is a fragmentary schematic top view illustrating a state where the securing unit 140 of the first exemplary rack assembly 100 secures a bicycle 510 thereto according to some embodiments of the present disclosure. In use, as shown in FIG. 5, when it is desired to load/mount the bicycle 510 onto the rack assembly 100, first and second wheels of the bicycle 510 are first placed on the first and second support members 120d, 120e of the first support unit 120, respectively. Then, the securing member 180 is moved/slid along the length of the post 160b from, e.g., the retracted position to a position, e.g., the extended position, such that the second leg 240 is substantially aligned with a frame member 520 of a frame of the bicycle 510. Thereafter, with further reference to FIG. 6, a first end 610 of the fastening member 190 is unfastened from the second base 220 and is fastened to the second leg 240. A second end 620 of the fastening member 190 is fastened to the frame member 520 of the bicycle 510. At this time, a middle portion 630 of the fastening member 190 between the first and second ends 610, 620 of the fastening member 190 forms a substantially right angle, instead of an inclined angle, with the securing member 180 and the frame member 520 of the bicycle 520. In other words, the middle portion 630 of the fastening member 190 extends in the first direction, e.g., substantially parallel to the Z axis or substantially perpendicular to the XY plane. Such an orientation of the middle portion 630 of the fastening member 190 ensures stabler and safer carrying of the bicycle 510 by the rack assembly 100 of the present disclosure.

Figure 7:
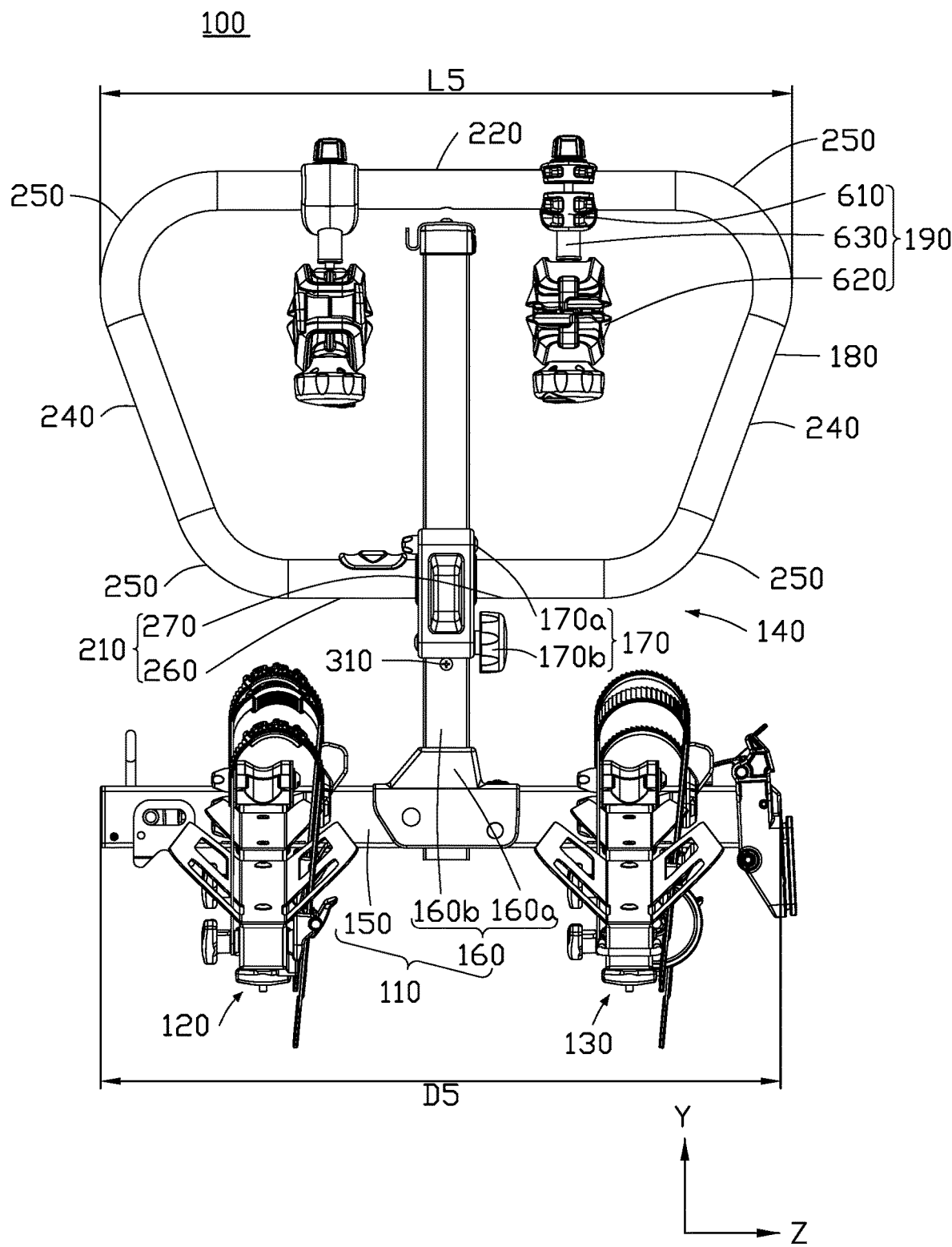
FIG. 7 is a schematic side view illustrating a state where the securing unit of the first exemplary rack assembly is in a storing position according to some embodiments of the present disclosure.

FIG. 7 is a schematic side view illustrating a state where the securing unit 140 of the first exemplary rack assembly 100 is in a storing position according to some embodiments of the present disclosure. When it is desired to put the securing unit 140 in the storing position, the securing unit 140 is first removed from the post portion 160b, e.g., by sliding or pulling the sliding member 170 out of the post portion 160b. Then, the securing member 180 is rotated, e.g., by about 90 degrees. Subsequently, the sliding member 170 is sleeved back on the post portion 160b. Thereafter, the securing member 180 is moved to the retracted position. At this time, as shown in FIG. 7, the securing member 180 extends substantially parallel to the first frame member 150.

In this exemplary embodiment, as shown in FIG. 7, the securing member 180 has a length (L5) substantially equal to a distance (D5) between first and second ends of the first frame member 150. In other words, the length (L5) of the securing member 180 is substantially equal to a length of the first frame member 150. In an alternative embodiment, the length (L5) of the securing member 180 is less than the length of the first frame member 150.

FIG. 8 is a schematic perspective view illustrating a state where the first exemplary rack assembly 100 is in a folded position according to some embodiments of the present disclosure. When it is desired to put the rack assembly 100 from the carrying position, as shown in FIG. 1, to the folded position, as shown in FIG. 8, the securing unit 140 is first put to the storing position, as shown in FIG. 7. Then, the first and second support links 120b, 120c are rotated toward each other about the pivot member 120a, whereby the rack assembly 100 is put in the folded position. At this time, as shown in FIG. 8, the first and second support links 120b, 120c form a folded angle therebetween less than the carrying angle, i.e., the angle between the first and second support links 120b, 120c when the rack assembly is in the carrying position. For example, the first and second support links 120b, 120c are substantially parallel to each other. For example, the folded angle is from about 0 degrees to about 10 degrees, e.g., about 5 degrees.

As shown in FIG. 8, when the rack assembly 100 is in the folded position, the securing unit 140 does not substantially protrude beyond the first and second ends of the first frame member 150. In addition, when the rack assembly 100 is in the folded position, a top of the securing member is substantially level with a top of the support links 120, 130. As such, the rack assembly 100 of the present disclosure is compact to store when not in use.

Figure 9:
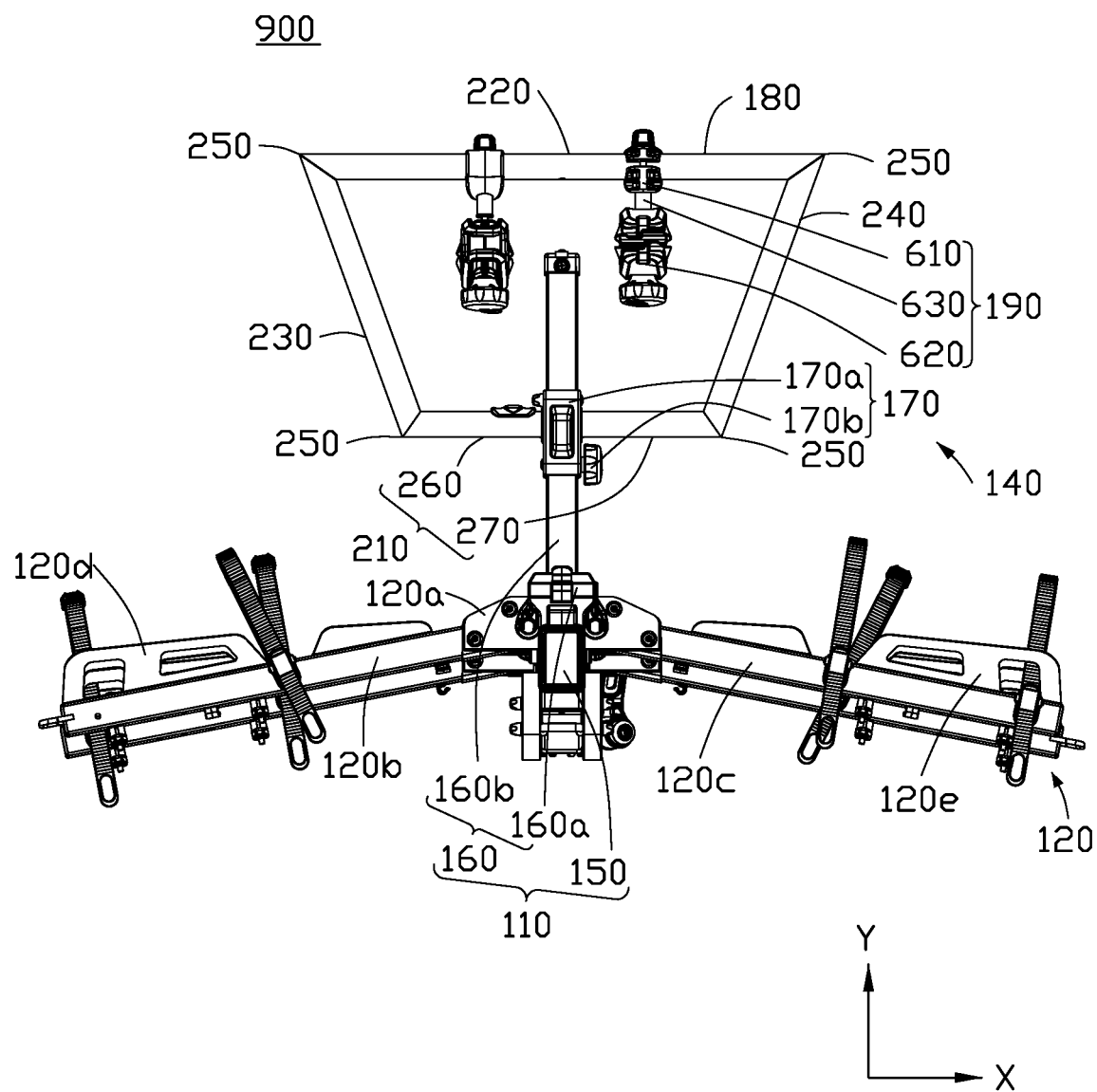
FIG. 9 is a schematic front view illustrating the second exemplary rack assembly according to some embodiments of the present disclosure.

FIG. 9 is a schematic front view illustrating the second exemplary rack assembly 900 according to some embodiments of the present disclosure. The rack assembly 900 of this embodiment differs from the rack assembly 100 in that at least one of the corners 250 of the securing member 180 of the rack assembly 900 is substantially sharp. For example, as shown in FIG. 9, the four corners 250 of the securing member 180 of the rack assembly 900 are substantially sharp.

Figure 10:
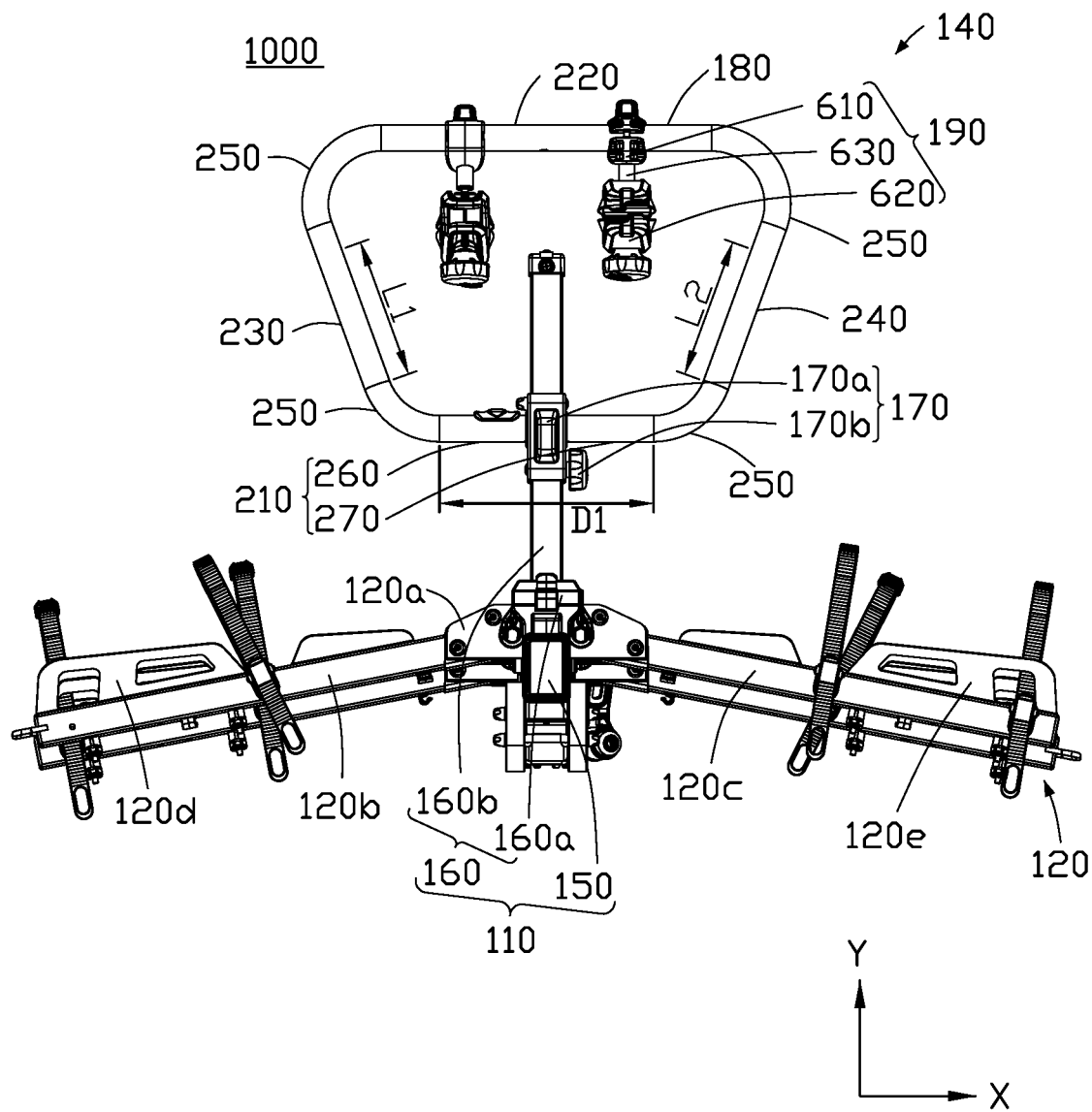
FIG. 10 is a schematic front view illustrating the third exemplary rack assembly according to some embodiments of the present disclosure.

FIG. 10 is a schematic front view illustrating the third exemplary rack assembly 1000 according to some embodiments of the present disclosure. The rack assembly 1000 of this embodiment differs from the rack assembly 100 in that the length (L1) of the first leg 230 and/or the length (L2) of the second leg 240 of the rack assembly 1000 is substantially equal to or greater than the distance (D1) between the second end of the first base portion 260 and the second end of the second base portion 270 of the rack assembly 1000. For example, as shown in FIG. 10, the length (L1, L2) of each of the first and second leg 230, 240 of the rack assembly 1000 is substantially equal to the distance (D1) between the second end of the first base portion 260 and the second end of the second base portion 270 of the rack assembly 1000.

Figure 11:
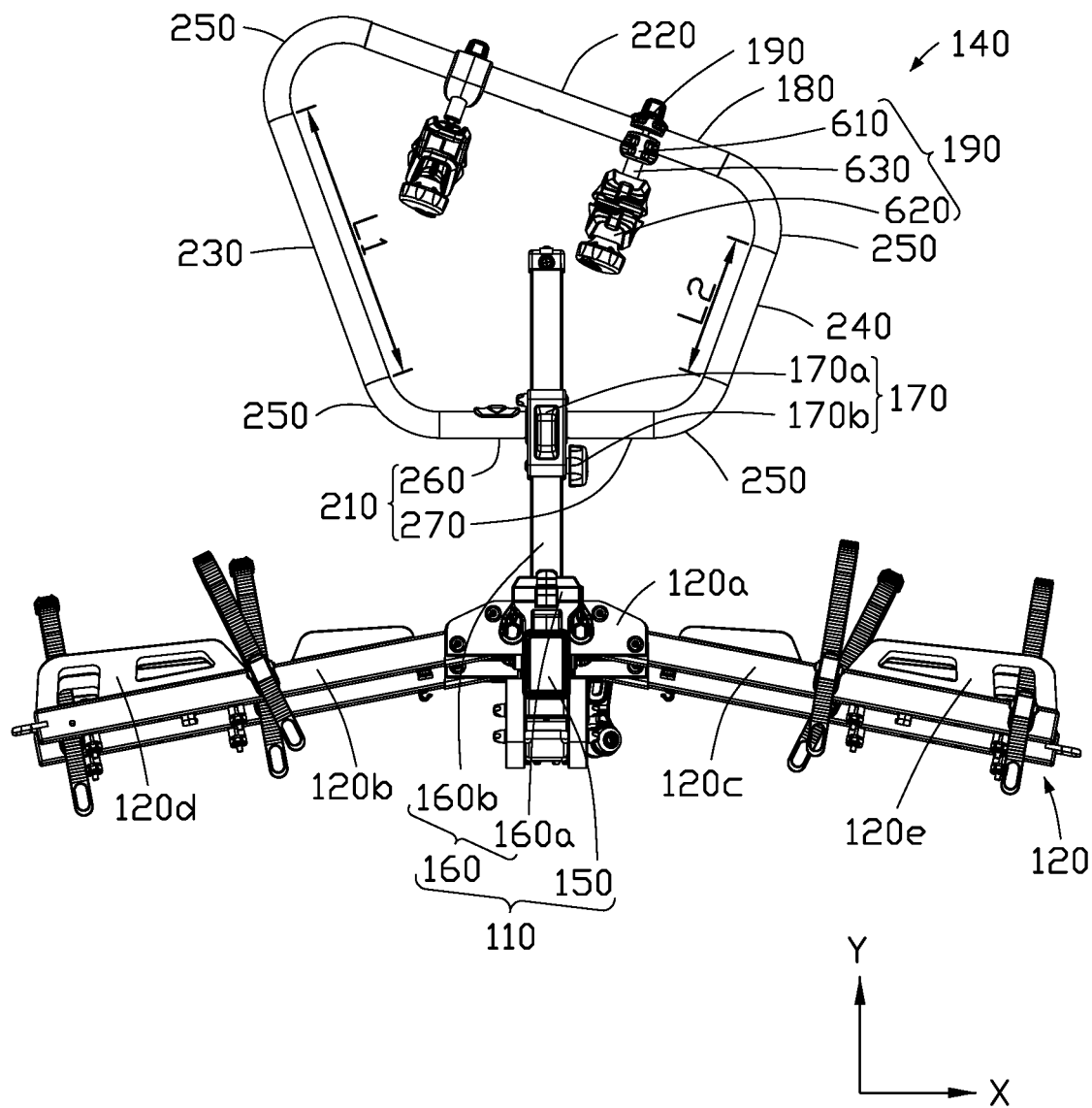
FIG. 11 is a schematic front view illustrating the fourth exemplary rack assembly according to some embodiments of the present disclosure.

FIG. 11 is a schematic front view illustrating the fourth exemplary rack assembly 1100 according to some embodiments of the present disclosure. The rack assembly 1100 of this embodiment differs from the rack assembly 100 in that the angle between the second base 220 and the first leg 230 of the rack assembly 1100 is different from the angle between the second base 220 and the second leg 240 of the rack assembly 1100. For example, as shown in FIG. 11, the angle between the second base 220 and the first leg 230 of the rack assembly 1100 is less than the angle between the second base 220 and the second leg 240 of the rack assembly 1100. In addition, the second base 220 is inclined to the Y axis. Moreover, the length (L1) of the first leg 230 is greater than the length (L2) of the second leg 240.

Figure 12:
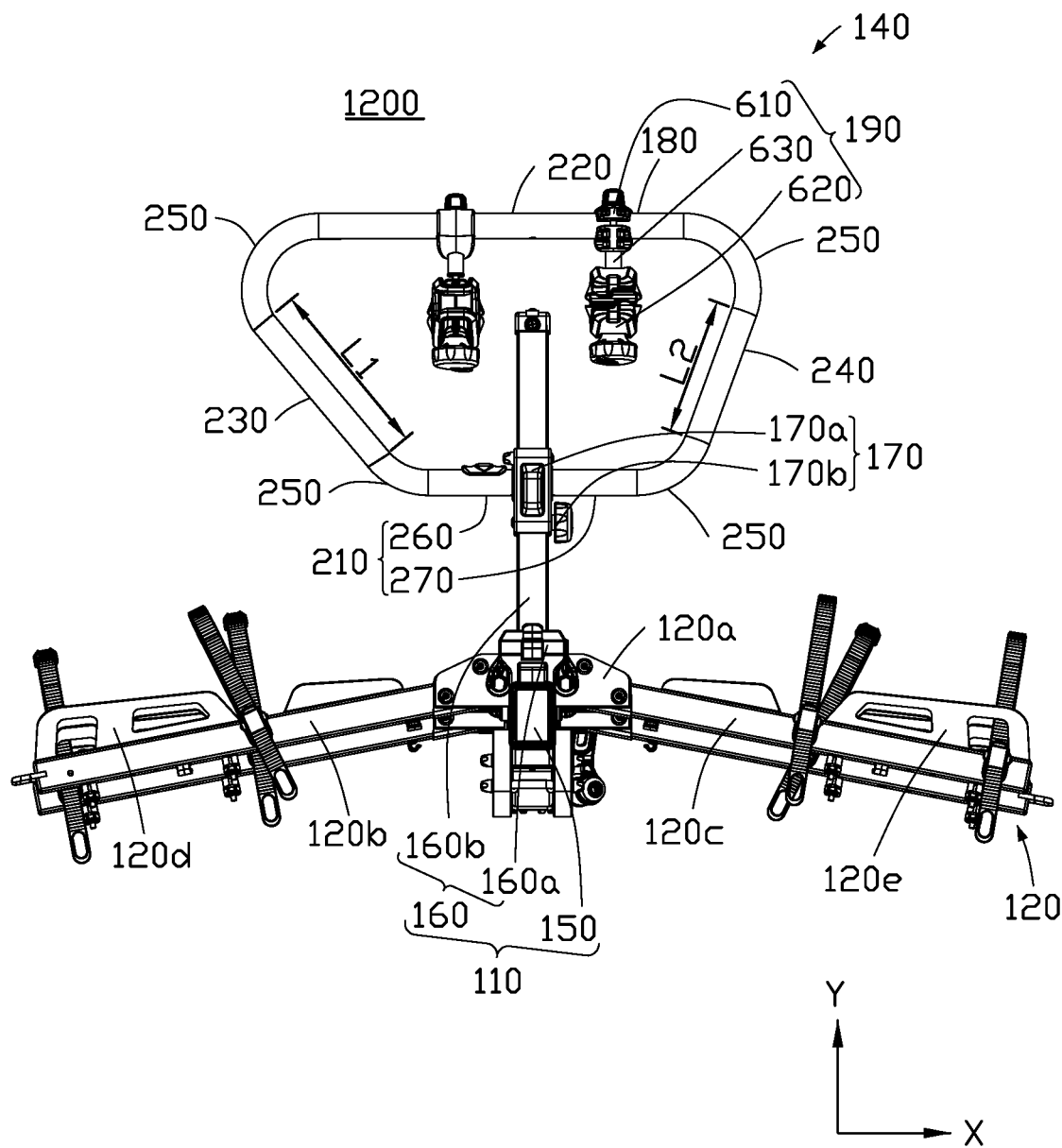
FIG. 12 is a schematic front view illustrating the fifth exemplary rack assembly according to some embodiments of the present disclosure.

FIG. 12 is a schematic front view illustrating the fifth exemplary rack assembly 1200 according to some embodiments of the present disclosure. The rack assembly 1200 of this embodiment differs from the rack assembly 100 in that the angle between the first base portion 260 and the first leg 230 of the rack assembly 1200 is different from the angle between the second base portion 270 and the second leg 240 of the rack assembly 1200. For example, as shown in FIG. 12, the angle between the first base portion 260 and the first leg 230 of the rack assembly 1200 is greater than the angle between the second base portion 270 and the second leg 240 of the rack assembly 1200. In addition, the length (L1) of the first leg 230 is greater than the length (L2) of the second leg 240.

Figure 13:
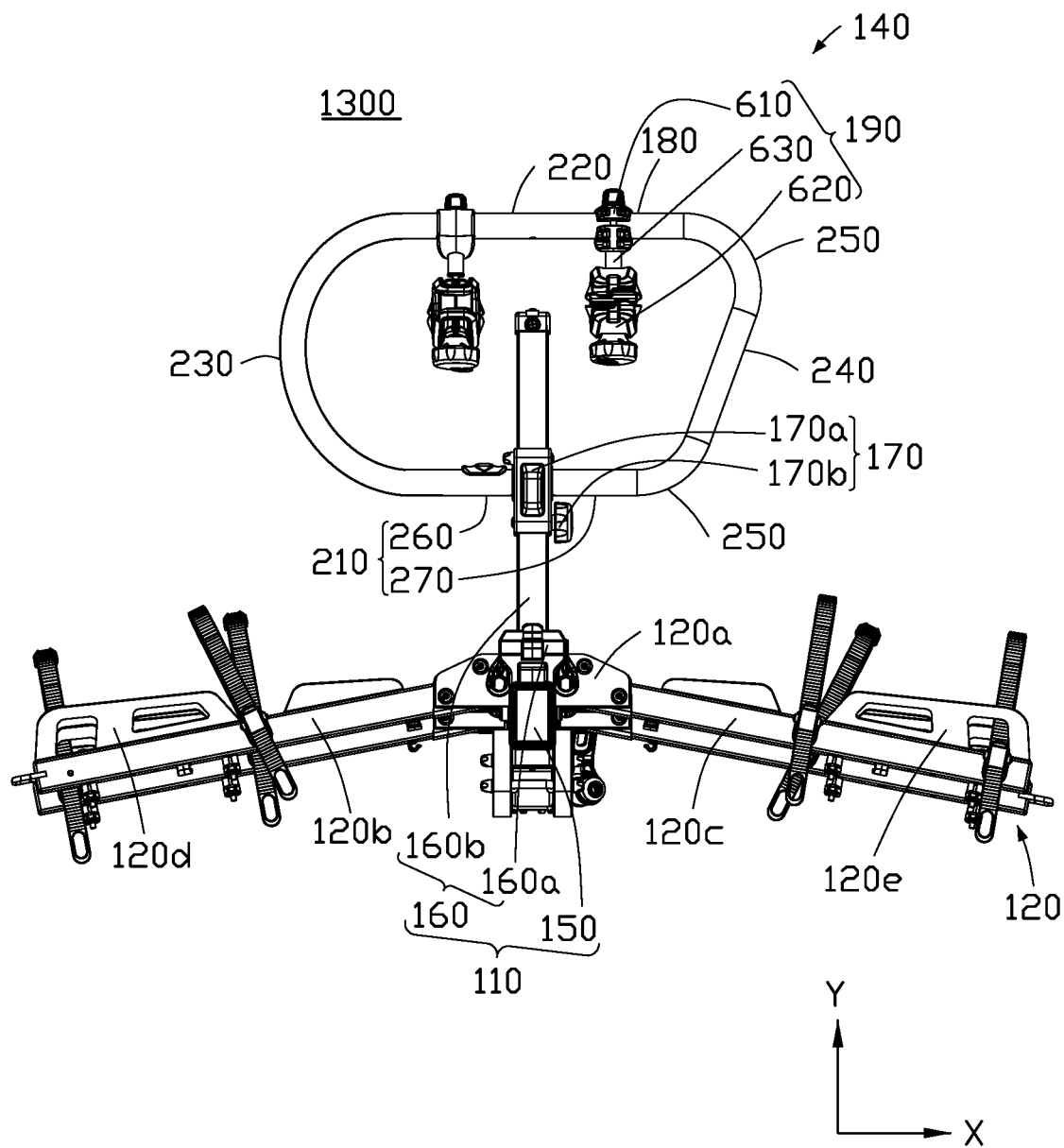
FIG. 13 is a schematic front view illustrating the sixth exemplary rack assembly according to some embodiments of the present disclosure.

FIG. 13 is a schematic front view illustrating the sixth exemplary rack assembly 1300 according to some embodiments of the present disclosure. The rack assembly 1300 of this embodiment differs from the rack assembly 100 in that at least one of the first base 210, the second base 220, the first leg 230, and the second leg 240 of the rack assembly 1300 is curved. For example, as shown in FIG. 13, the first leg 230 of the rack assembly 1300 is curved.

Figure 14:
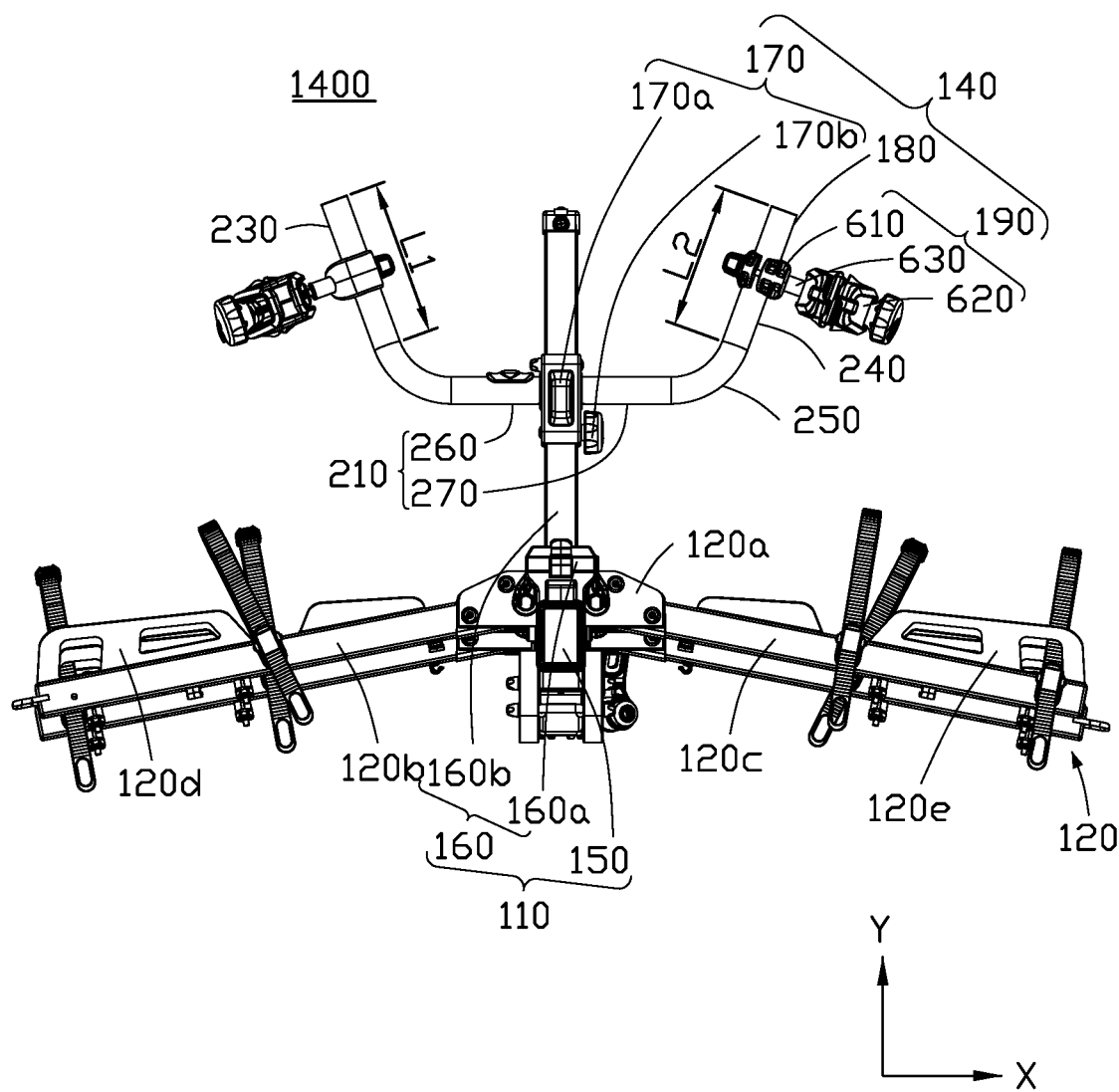
FIG. 14 is a schematic front view illustrating the seventh exemplary rack assembly according to some embodiments of the present disclosure.

FIG. 14 is a schematic front view illustrating the seventh exemplary rack assembly 1400 according to some embodiments of the present disclosure. The rack assembly 1400 of this embodiment differs from the rack assembly 100 in that the rack assembly 1400 is dispensed with at least one of the first base 210, the second base 220, the first leg 230, and the second leg 240. For example, as shown in FIG. 14, the rack assembly 1400 is dispensed with the second base 220. In some embodiments, the length (L1) of the first leg 230 is substantially equal to the length (L2) of the second leg 240. In other embodiments, the length (L1) of the first leg 230 may be different from the length (L2) of the second leg 240. For example, the angle between the first base portion 260 and the first leg 230 is substantially equal to the angle between the second base portion 270 and the second leg 240. The angle between the first base portion 260 and the first leg 230 may be different from the angle between the second base portion 270 and the second leg 240.

Figure 15:
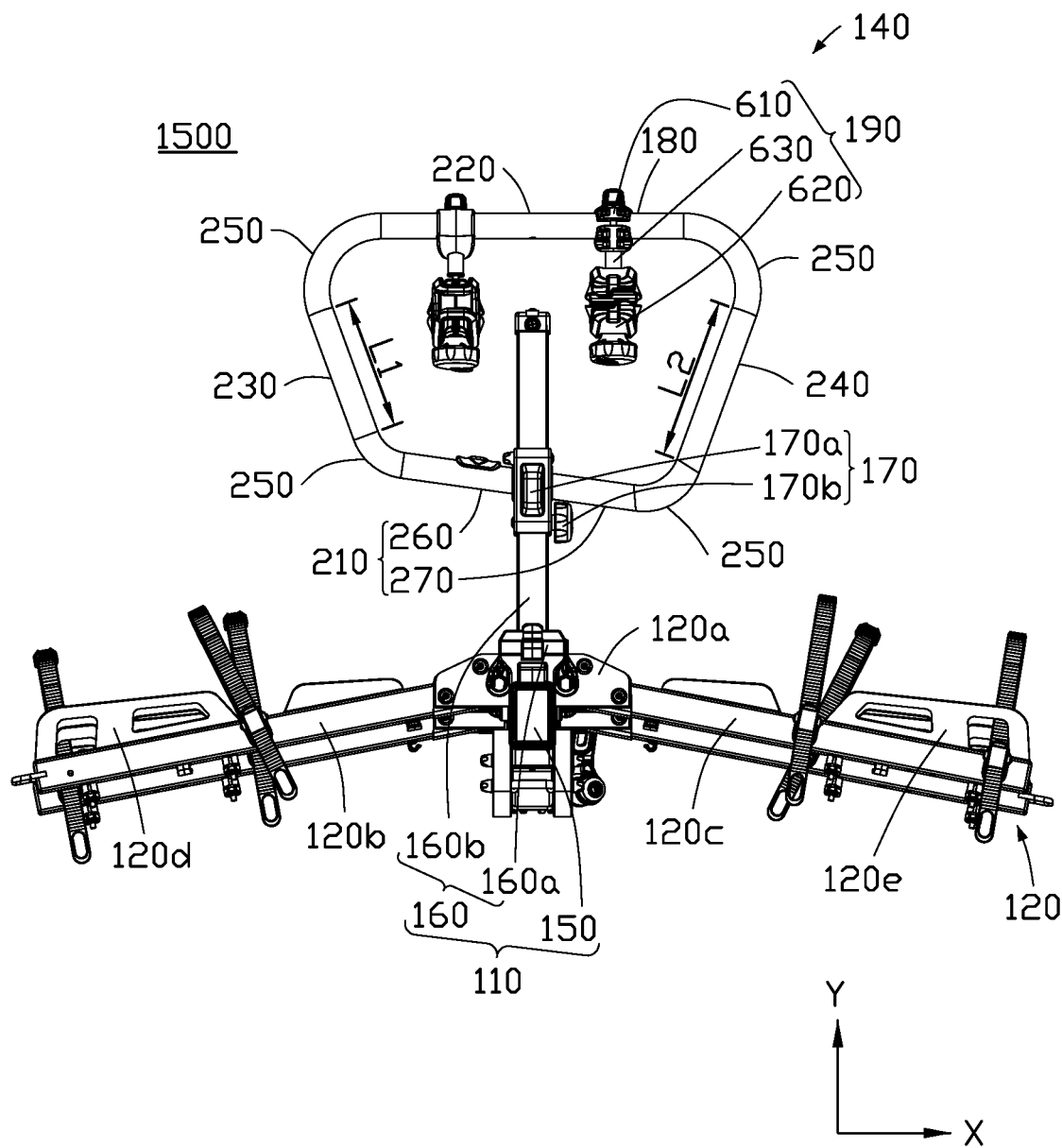
FIG. 15 is a schematic front view illustrating the eighth exemplary rack assembly according to some embodiments of the present disclosure.

FIG. 15 is a schematic front view illustrating the seventh exemplary rack assembly 1500 according to some embodiments of the present disclosure. The rack assembly 1500 of this embodiment differs from the rack assembly 100 in that the first base 210 of the rack assembly 1500 is inclined to the post portion 160b, e.g., the Y axis. For example, as shown in FIG. 15, the first base portion 260 and the post portion 160b form an angle therebetween less than an angle between the second base portion 270 and the post portion 160b. In addition, the length (L1) of the first leg 230 is less than the length (L2) of the second leg 240.

According to an exemplary embodiment of the present disclosure, a rack assembly configured to carry a load comprises a frame unit, a support unit, and a securing unit. The support unit is coupled to the frame unit and is configured to support the load thereon. The securing unit is coupled to the frame unit, is configured to secure the load thereto, and includes a first base, a second base, a first leg, and a second leg. The second base has a length greater than a distance between first and second ends of the first base. The first leg interconnects the first end of the first base and the second base. The second leg interconnects the second end of the first base and the second base.

According to another exemplary embodiment of the present disclosure, a rack assembly configured to carry a load comprises a frame unit, a support unit, and a securing unit. The frame unit includes a first frame member and a second frame member substantially perpendicular to the first frame member. The support unit is coupled to the first frame member and is configured to support the load thereon. The securing unit is configured to secure the load thereto and includes a first base coupled to the second frame member and a first leg coupled to the first base and inclined to the second frame member.

According to another exemplary embodiment of the present disclosure, a securing unit of a rack assembly comprises a sliding member and a securing member. The securing member includes a first base, a second base, a first leg, and a second leg. The first base is coupled to the sliding member. The second base is above the first base. The first leg interconnects a first end of the first base and the second base. The second leg interconnects a second end of the first base and the second base.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A rack assembly configured to carry a load, comprising:
   a frame unit including
      a first frame member that extends in a first direction, and
      a second frame member that extends in a second direction substantially perpendicular to the first direction;
   a support unit coupled to the first frame member of the frame unit and configured to support the load thereon; and
   a securing unit coupled to the second frame member of the frame unit, configured to secure the load thereto, and including a securing member that has a length substantially equal to a length of the first frame member of the frame unit, wherein the securing member includes
      a first base,
      a second base above the first base and having a length greater than a distance between first and second ends of the first base,
      a first leg interconnecting the first end of the first base and a first end of the second base, and
      a second leg interconnecting the second end of the first base and a second end of the second base.

2. The rack assembly of claim 1, wherein the first base and the first leg form an angle therebetween substantially equal to an angle between first base and the second leg.

3. The rack assembly of claim 1, wherein the second base and the first leg form an angle therebetween substantially equal to an angle between the second base and the second leg.

4. The rack assembly of claim 1, wherein the first leg has a length substantially equal to a length of the second leg.

5. The rack assembly of claim 1, wherein the first base extends in a third direction substantially perpendicular to the second direction.

6. A rack assembly configured to carry a load, comprising:
a frame unit including
   a first frame member, and
   a second frame member substantially perpendicular to the first frame member;
a support unit coupled to the first frame member and configured to support the load thereon; and
a securing unit above the first frame member, configured to secure the load thereto, and including
   a first base coupled to and configured to move along the length of the second frame member,
   a second base above the first base and having a length greater than a distance between first and second ends of the first base,
   a first leg coupled between the first end of the first base and the second base and inclined to the second frame member, and
   a second leg coupled between the second end of the first base and the second base, inclined to the second frame member, and has a length substantially equal to a length of the first leg.

7. The rack assembly of claim 6, wherein the first base is substantially perpendicular to the second frame member.

8. A rack assembly configured to carry a load, comprising:
a frame unit including
   a first frame member, and
   a second frame member substantially perpendicular to the first frame member;
a support unit coupled to the first frame member and configured to support the load thereon;
a securing unit above the first frame member, configured to secure the load thereto, and including:
   a sliding member coupled to and configured to move along the length of the second frame member; and
   a securing member including
      a first base coupled to and co-movable with the sliding member,
      a second base above the first base and having a length greater than a distance between first and second ends of the first base,
      a first leg interconnecting the first end of the first base and the second base, and
      a second leg interconnecting the second end of the first base and the second base, wherein the first and second bases and the first and second legs form a trapezoidal shape.

9. The securing unit of claim 8, wherein the sliding member surrounds an axis and the first base is substantially perpendicular to the axis.

10. The rack assembly of claim 6, wherein the securing unit further includes a sliding member sleeved on and configured to move along the length of the second frame member, wherein the first base is coupled to and co-movable with the sliding member.

11. The rack assembly of claim 6, further comprising a restricting member protruding from the second frame member and disposed between the securing unit and the first frame member, wherein the securing unit is movable relative to the second frame member between an extended position, where the securing unit is spaced from the restricting member, and a retracted position, where the securing unit abuts the restricting member.

12. The rack assembly of claim 11, wherein, when the securing unit is at the retracted position, the second base is above and forms a gap with a top of the second frame member.

13. The rack assembly of claim 11, wherein, when the securing unit is at the retracted position, the support unit is pivotable relative to the first frame member to a folded position, where a top of the support unit is substantially level with a top of the securing unit.

14. The rack assembly of claim 6, further comprising a second support unit pivotably coupled to the first frame member and the second frame member is between the support unit and the second support unit.

15. The rack assembly of claim 6, further comprising a fastening member connected to the securing unit and configured to fasten the load to the securing unit.

16. The rack assembly of claim 8, further comprising a restricting member protruding from the second frame member and disposed between the securing unit and the first frame member, wherein the securing unit is movable relative to the second frame member between an extended position, where the securing unit is spaced from the restricting member, and a retracted position, where the securing unit abuts the restricting member.

17. The rack assembly of claim 16, wherein, when the securing unit is at the retracted position, the second base is above and forms a gap with a top of the second frame member.

18. The rack assembly of claim 16, wherein, when the securing unit is at the retracted position, the support unit is pivotable relative to the first frame member to a folded position, where a top of the support unit is substantially level with a top of the securing unit.

19. The rack assembly of claim 8, further comprising a second support unit pivotably coupled to the first frame member and the second frame member is between the support unit and the second support unit.

20. The rack assembly of claim 8, further comprising a fastening member connected to the securing unit and configured to fasten the load to the securing unit.

* * * * *